US006193457B1

(12) United States Patent
Pacione

(10) Patent No.: US 6,193,457 B1
(45) Date of Patent: Feb. 27, 2001

(54) PRINTABLE FILE FOLDER WITH CUSTOM LABEL TAB

(75) Inventor: Peter L. Pacione, Mississauga (CA)

(73) Assignee: Esselte Corporation, Garden City, NY (US)

( * ) Notice: Subject to any disclaimer, the term of this patent is extended or adjusted under 35 U.S.C. 154(b) by 0 days.

(21) Appl. No.: 09/274,333

(22) Filed: Mar. 23, 1999

Related U.S. Application Data

(63) Continuation-in-part of application No. 09/209,265, filed on Dec. 11, 1998.

(51) Int. Cl.[7] .......................... B65D 27/00; B32B 31/10; G09F 23/10

(52) U.S. Cl. ........................ 412/1; 270/58.04; 270/58.31; 270/58.32; 283/21; 40/641; 40/359

(58) Field of Search .............................. 270/58.04, 58.31, 270/58.32; 283/21; 40/641, 359; 412/1

(56) References Cited

U.S. PATENT DOCUMENTS 4,329,191 * 5/1982 Barber .................................... 283/21
4,905,393 * 3/1990 Laurie .................................... 40/641
5,025,978 * 6/1991 Pacione .................................. 40/359

FOREIGN PATENT DOCUMENTS 1103716 6/1981 (CA) .

OTHER PUBLICATIONS

WO 99 22359 A (Avery Dennison); May 6, 1999; p. 7, lines 3–14; Figures 8A, 8B.

* cited by examiner

*Primary Examiner*—A. L. Wellington
*Assistant Examiner*—Mark T. Henderson
(74) *Attorney, Agent, or Firm*—Riches, McKenzie & Herbert LLP

(57) ABSTRACT

A blank is provided adapted for forming into a file folder. The blank comprises a planar sheet having a first surface and a second surface. The sheet has a first cover portion joined to a second cover portion along a mutual cover hinge line. The sheet is adapted for folding about the cover hinge line such that the first cover portion and second cover portion overlie each other and the folder is adapted to receive sheet material therebetween. The first cover portion includes a tab extension along one edge thereof either adjacent to the fold line or opposite thereto. The tab extension includes an inner tab portion and an outer tab portion joined together along a mutual hinge line. Folding the tab extension about the tab fold line causes the outer tab portion to overlie the inner tab portion forming a tab which extends from an edge of the first cover portion beyond the second cover portion when the second cover portion is folded to overlie the first cover portion. The inner tab portion and outer tab portion both have labelling areas on their surfaces which are adapted to have indicia printed thereon by a printing mechanism. The sheet is adapted when unfolded to be passed through a printing machine and to have labelling indicia printed on the labelling areas of both the inner tab portion and the outer tab portion. After printing, by folding the outer tab portion to overlie the inner tab portion, the outer tab portion and inner tab portion are secured together to permanently form the tab and present the printed indicia visible on both sides of the tab. The sheet carries an adhesive strip which can be activated after printing such that the adhesive strip secures the inner tab portion to the outer tab portion.

3 Claims, 14 Drawing Sheets

FIG. 1.
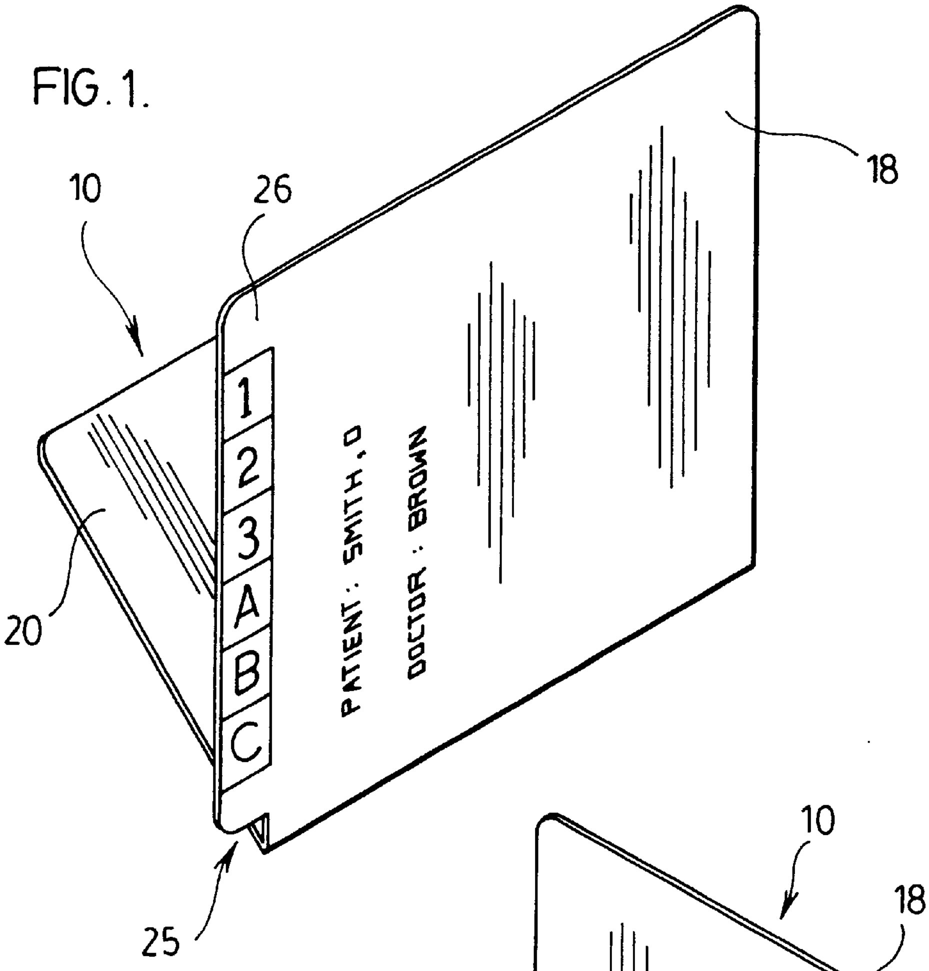
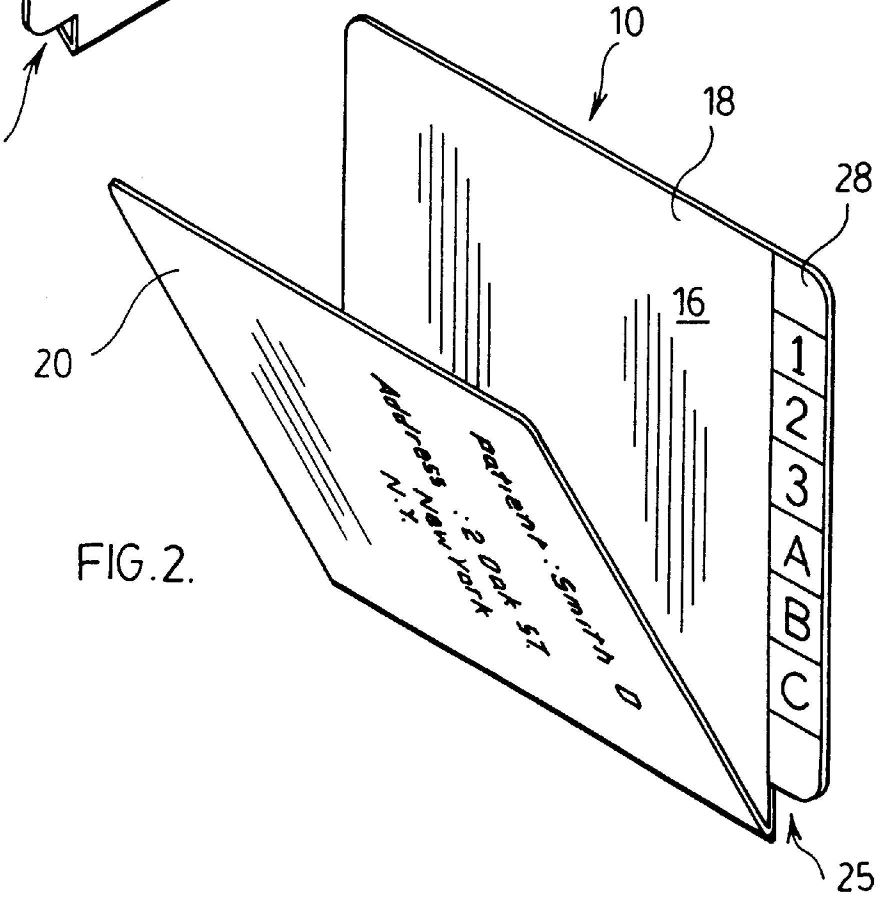
FIG. 2.

2/14

PRINTABLE FILE FOLDER WITH CUSTOM LABEL TAB

RELATED APPLICATION

This is a continuation-in-part of U.S. patent application Ser. No. 09/209,265, filed Dec. 11, 1998.

FIELD OF THE INVENTION

This invention relates to file folders with identifying tabs and, more particularly, to file folders which can be individually custom printed.

BACKGROUND OF THE INVENTION

File folders are known in which a tab extends from an end, side or top of a folder. The tab is visible when the files are positioned as in a file drawer or on a shelf. With a shelf file system, the folder is commonly referred to as an "end tab" or "side tab" folder to distinguish it from "top tab" folders typically used in drawer files.

The end tabs are labelled, preferably on both sides, with identifying information including a coding system involving the use of numbers, letters and colours. Preferred systems utilize varying sequences of colour codes such that a person looking down a row of files may readily see a colour discontinuity if a coloured file is misfiled from a particular arrangement of colour sequences. For example, the colour sequences provide wide flexibility in classification and sub-classification of the files in a visually apparent sequence.

Adhesive labels are known to be applied to the tabs to provide the necessary identifying information. Known labelling systems include labels which are folded about the edge of the tab so as to provide identical information on both sides of the tab. Individual labels are provided for each number and letter appropriately colour-coded. Such labelling systems have the disadvantage that to appropriately label a tab, a user must make a selection of the correct label for a plurality of numbers and/or letters and must individually apply the labels correctly sequenced and at correct locations on the tab.

A disadvantage with known file folders is that it is difficult to place custom information on the interior and exterior surfaces of the file folder. Typically, this disadvantage is overcome as by preprinting forms on the file folder surfaces which later can individually be filled out. Again, this has the disadvantage of requiring a considerable amount of time. The file folder may be difficult to pass through conventional printers particularly when folded double or when it has adhesive labels attached to both sides of the tab which might become damaged or detached.

Rather than mark the file folder itself with information relevant to that file, frequently, information relevant to that file is printed as on a separate piece of paper which is then placed in the file or somehow attached thereto. This has the disadvantage that the information sheet can become detached from the file folder and, as well, the disadvantage that additional paper is required resulting in increased use of shelf space.

Previously known systems generally suffer the disadvantage of requiring a substantial amount of handling in order to customize any particular file. Such handling is a disadvantage, first of all, as being expensive and, secondly, being subject to error. Further, previously known systems require stocking of blank files, stocking of labels and possible separate printing of file information on separate sheets. The fact that a number of components need to be assembled renders batch processing difficult and increases the likelihood of errors arising when a number of file folders are to be created at the same time, particularly, in an environment such as in law offices, medical offices, insurance companies, government agencies and the like where significant numbers of unique individual file folders are required to be created on a regular basis.

SUMMARY OF THE INVENTION

To at least partially overcome these disadvantages of previously known devices, the present invention provides a file folder which is adapted for custom printing of identifying information on both sides of an identifying tab and a method of printing such a file folder.

An object of the present invention is to provide a file folder which can be passed through a printer and have identifying information printed on both surfaces of an identifying tab.

Another object of the present invention is to provide a method for automated custom identification of file folders by printing identifying information on two surfaces of identifying tabs.

Another object is to provide a method for automated printing of information on a file folder including information on an identification tab and information on other surfaces of the folder.

Accordingly, one aspect the present invention provides a blank adapted for forming a folder, the blank comprising a substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab hinge line therebetween wherein on folding the tab extension about the tab fold line in one direction the second surface of the sheet on the outer tab portion overlies the second surface of the sheet on the inner tab portion, wherein with the sheet folded about the cover hinge line and the tab fold line, the inner tab portion and the outer tab portion overlying the inner tab portion extend from the first cover portion beyond the second cover portion, an inner labelling area on the first surface of the sheet over the inner tab portion adapted to have indicia printed thereon by a printing mechanism, and an outer labelling area on the first surface of the sheet over the outer tab portion adapted to have labelling indicia printed thereon by a printing mechanism.

The blank is adapted to maintain the second surface of the inner tab portion and the second surface of the exterior tab portion in overlying relation together when the tab extension is folded in the one direction about the tab fold line. Various mechanisms may be used to secure the tab portions together including adhesives, adhesive strips and preformed sleeves, bands and/or sheets of transparent materials applied after the tab portions have been printed with indicia.

A blank is provided adapted for forming into a file folder. The blank comprises a planar sheet having a first surface and a second surface. The sheet has a first cover portion joined to a second cover portion along a mutual cover hinge line. The sheet is adapted for folding about the cover hinge line such that the first cover portion and second cover portion overlie each other and the folder is adapted to receive sheet material therebetween. The first cover portion includes a tab extension along one edge thereof either adjacent to the fold line or opposite thereto. The tab extension includes an inner tab portion and an outer tab portion joined together along a mutual hinge line. Folding the tab extension about the tab fold line causes the outer tab portion to overlie the inner tab portion forming a tab which extends from an edge of the first cover portion beyond the second cover portion when the second cover portion is folded to overlie the first cover portion. The inner tab portion and outer tab portion both have labelling areas on their surfaces which are adapted to have indicia printed thereon by a printing mechanism. The sheet is adapted when unfolded to be passed through a printing machine and to have labelling indicia printed on the labelling areas of both the inner tab portion and the outer tab portion. After printing, by folding the outer tab portion to overlie the inner tab portion, the outer tab portion and inner tab portion overlie each other to form the tab and present the printed indicia visible on both sides of the tab. The outer tab portions and inner tab portions may be maintained to overlie each other by many different securing mechanisms. As one mechanism, the sheet may carry an adhesive strip which can be activated after printing such that the adhesive strip secures the inner tab portion to the outer tab portion.

As other mechanisms, a sleeve-like member may encircle the tab member to hold the outer and inner tab portions together. As another mechanism, a clear label may be applied over, preferably, the surfaces of the tab portions after printing and band the tab portions together at their side edges and/or to the remainder of the folder at an end edge.

The present invention also provides a method for automated printing of information on a file folder comprising in a single pass through a printing machine printing identifying indicia on the same surface of both the outer tab portion and the inner tab portion, thereafter securing the other surface of the inner tab portion to the other surface of the outer tab portion. At the time of printing indicia on the tab extension, other information may be printed on the same surface of the first and second cover portion.

The blank and its method of use to form a file folder in accordance with the present invention provides for advantageous automated customization of individual files including an identifying indicia, numbers, letters and/or other symbols and, particularly, colour coding of the same.

BRIEF DESCRIPTION OF THE DRAWINGS

Further aspects and advantages of the present invention will become apparent from the following description taken together with the accompanying drawings in which:

FIGS. 1 and 2 are pictorial views of the front and rear of a preferred first embodiment of a file folder in accordance with the present invention;

DETAILED DESCRIPTION OF THE DRAWINGS

Figure 4:
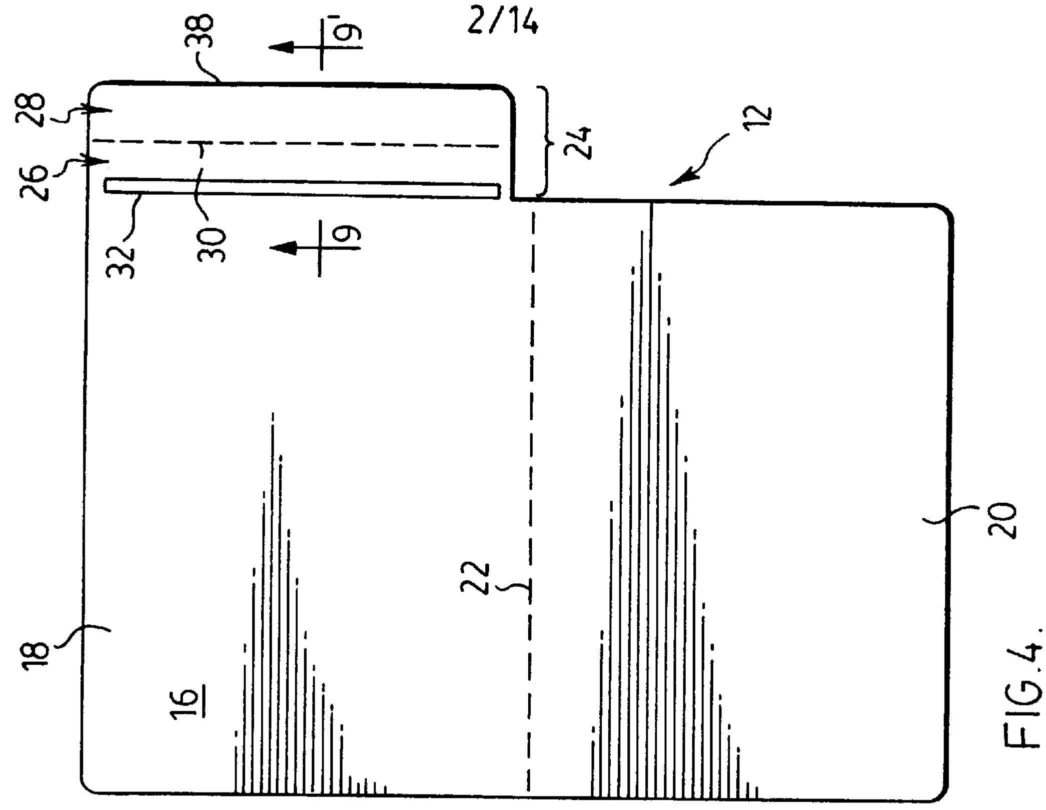
FIG. 4 is a bottom plan view of the folder blank of FIG. 3.
Figure 3:
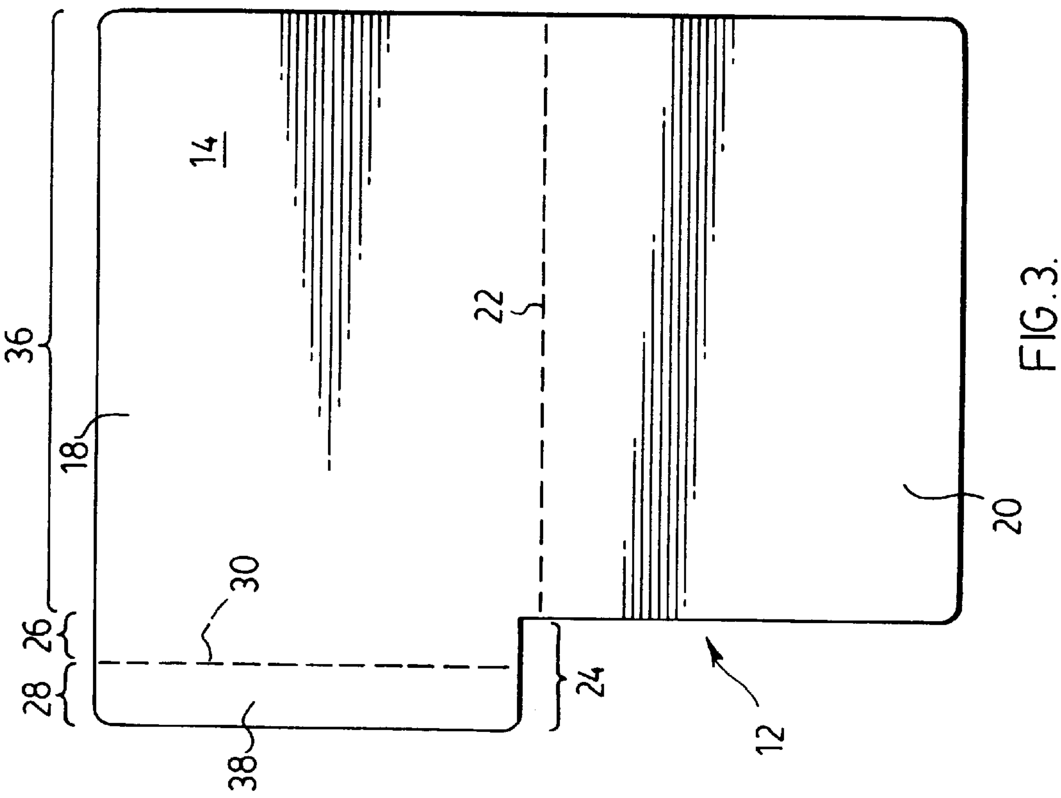
FIG. 3 is a top plan view of a first side of a folder blank in accordance with the preferred embodiment of this invention in an unfolded condition.
Figure 9:
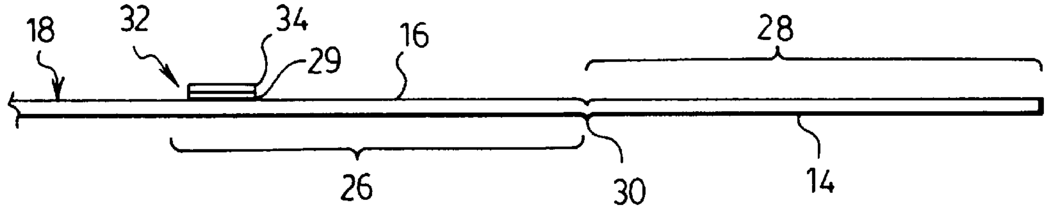
FIG. 9 is a partial cross-sectional view of the folder blank of FIG. 4 along section line 9–9'.

Reference is made first to FIGS. 1 and 2 which show a first preferred embodiment of a file folder 10 in accordance with the first aspect of the present invention. FIGS. 3 and 4 show blank or sheet 12 comprising a planar sheet of material, preferably paperboard, from which the folder 10 of FIG. 1 is made in accordance with a method of the present invention. FIG. 3 shows a plan view of a first surface 14 of the blank or sheet 12. FIG. 4 shows a plan view of the second surface 16 of the sheet 12. The sheet 12 has a first cover portion generally indicated 18 and a second cover portion generally indicated 20 joined by a fold line 22 therebetween. The first cover portion includes a tab extension 24 along one edge of the first cover portion 18. The tab extension comprises an inner tab portion 26 and an outer tab portion 28 joined by a tab fold line 30 extending therebetween. The second surface 16 of the sheet 12 carries an adhesive strip generally indicated 32. As seen in FIG. 9, the adhesive strip

32 comprises an elongate strip of adhesive material 29 permanently secured onto second surface 16 and having a release strip 34 covering its entire length. With the release strip 34 removed, the adhesive strip 32 is then activated and able to engage and permanently secure to the second surface 16 of the outer tab portion 28 when the outer tab portion 28 is folded in one direction about the tab fold line 30 so that the outer tab portion 28 overlies the inner tab portion 26.

The sheet 12 in its planar form as shown in FIG. 3 with the sheet 12 not folded about either the tab fold line or the cover fold line and thus existing as a substantially continuous planar sheet, is adapted to be passed through a printer for printing on first surface 14, preferably, in a single pass through a printer.

Figure 13:
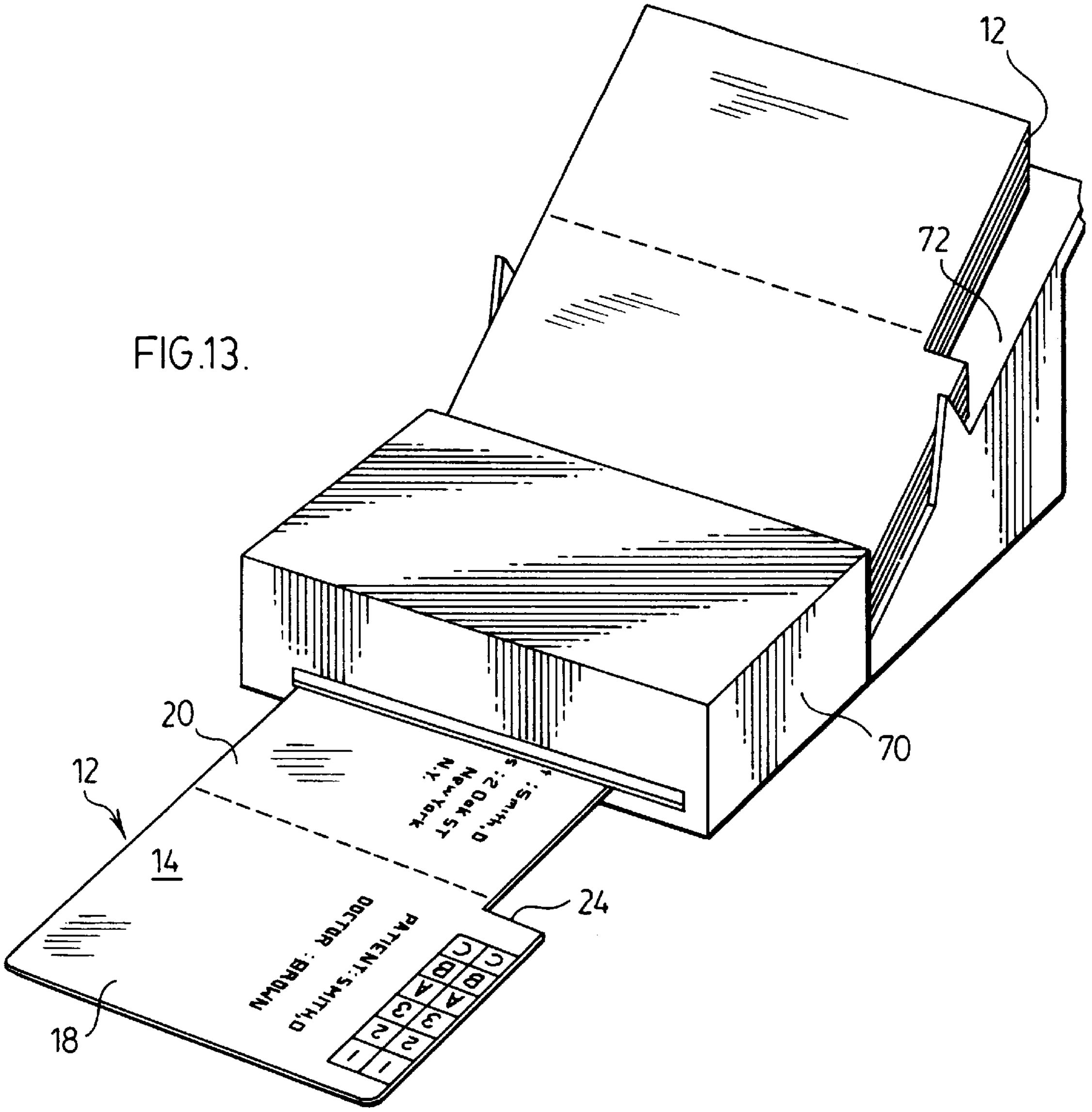
FIG. 13 is a schematic pictorial view of a printer adapted for automated printing of folder blanks in accordance with the present invention.

FIG. 13 schematically shows a desktop printer 70 having a feed sheet bin 72 to receive a plurality of the blanks 12 to feed them to the printer printing indicia on the first surface 14 of each blank 12. FIG. 13 shows a blank after having been printed exiting from the printer. The printer may be of a conventional construction as, for example, to comprise an impact printer such as a dot matrix printer or, more preferably, to comprise an ink jet or laser printer.

Preferably, the printer 70 is capable of printing colour on the blank 12. The printer is provided to be of a size such that the blank 12 can pass therethrough in a planar flat condition as shown and, therefore, the printer must have a width for passing sheet material therethrough at least equal to the least dimensional width of the blank 12. The printer may preferably have a capability to print over the entire width of the blank 12, however, may advantageously be provided. for example, to merely print over portions of the blank. Similarly, while it is desired that the printer be able to print colour, it can be satisfactory for the printer to have a capability of printing colour merely over the portion where the tab extension 24 passes therethrough.

Figure 6:
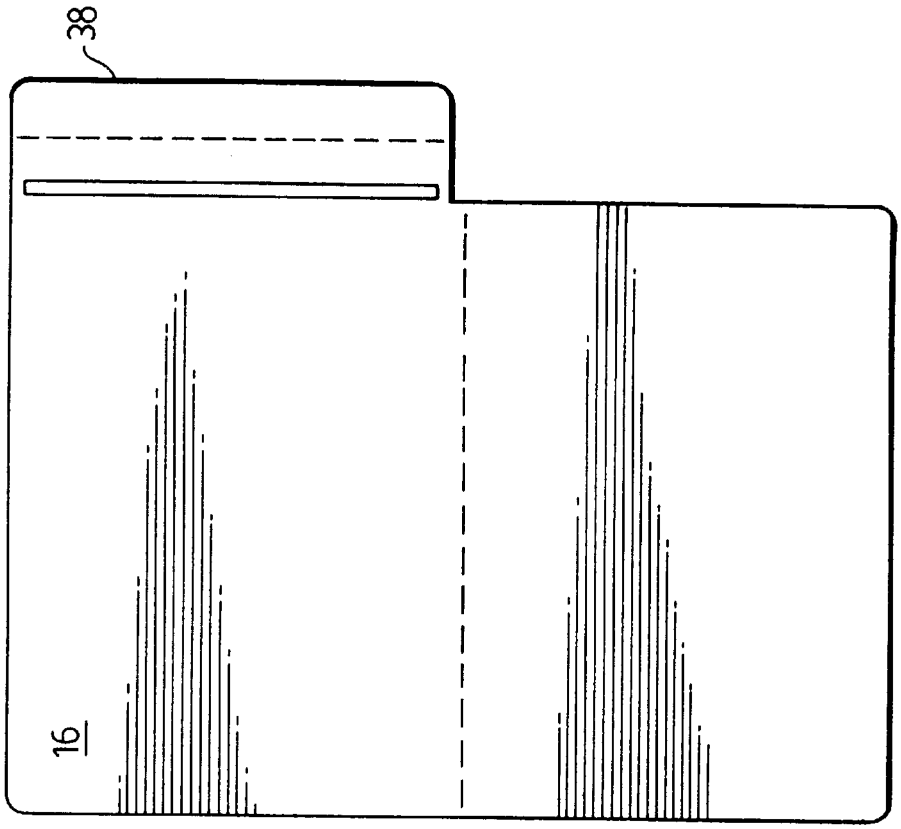
FIG. 6 shows a bottom plan view of the folder blank of FIG. 3 after printing.
Figure 5:
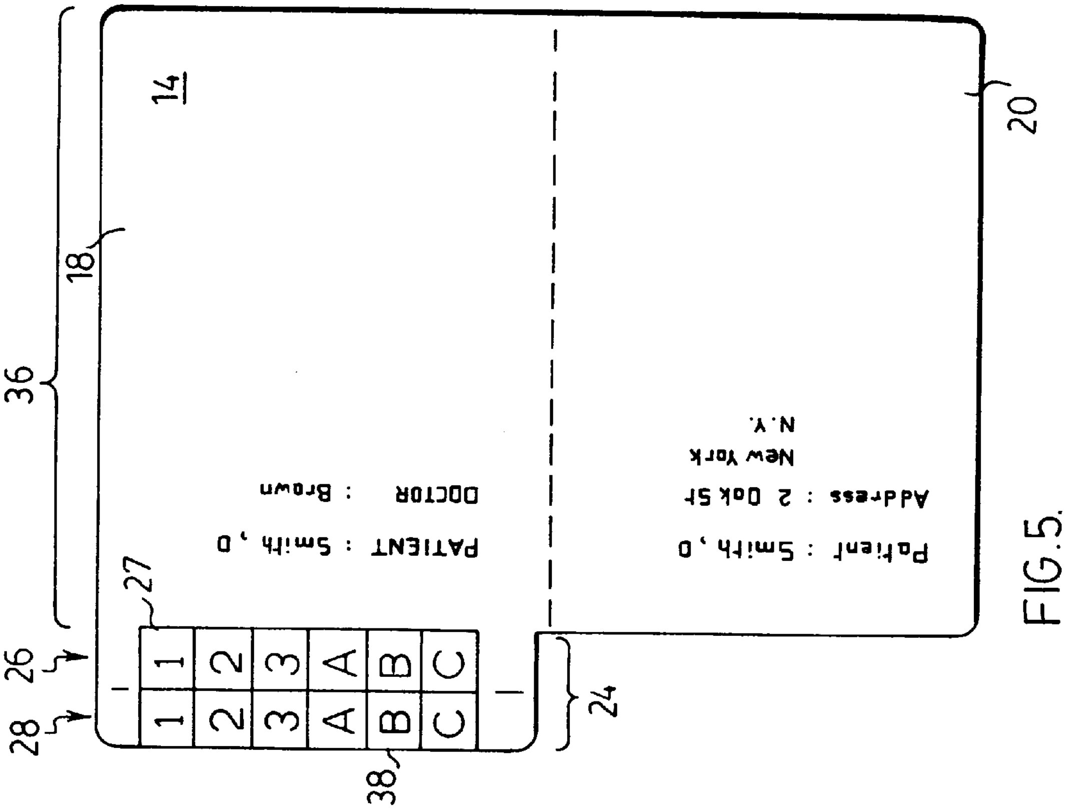
FIG. 5 shows a top plan view of the folder blank of FIG. 3 after printing.

FIGS. 5 and 6 show the blank 12 after the blank 12 has passed through the printer. As shown in FIGS. 5 and 6, there has been printing merely on the first surface 14 and no printing on the second surface 16. If printing may be desired on the second surface 16, the blank 12 may be passed through the printer inverted in a second pass.

As seen in FIG. 5, identifying indicia identified as indexing information "123ABC" has been printed both on the inner tab portion 26 and the outer tab portion 28. Each of these numbers and letters is shown in the drawings as being placed within a square one of which squares is indicated as 27 delineated by thin lines. Each square has its own colour and, for convenience, the drawings have not been shaded so as to show different colours. The square about each number or letter may, on the file cover, be shown as preferably different than the colour of the square for any of the other numbers. However, the square for the number 1 is, preferably, the same both on the inner tab portion 26 and on the outer tab portion 28.

The area defined by the squares containing the numbers and letters is on the inner tab portion 26 an inner labelling area and on the outer tab portion 28 an outer labelling area. These inner and outer labelling areas on the tab extension 24 are to be provided as areas on the first surface 14 which are adapted for printing and to readily receive and retain indicia printed thereon by a suitable printing machine.

FIG. 5 also shows that identifying indicia and information has been printed on the first surface 14 other than on the tab extension 24.

The first cover portion 18 may be seen as consisting of the tab extension 24 and, in addition, a remaining substantially rectangular portion generally indicated 36. The generally rectangular portion 36 has four edges with the fold line 22 forming one edge. The extension tab 24 of the first embodiment is provided on an edge of the rectangular portion 36 adjacent the fold line 22. The tab extension 24 extends from an edge of the rectangular portion 36 with the inner tab portion 26 separating the outer tab portion 28 from the remaining rectangular portion 36 of the first cover portion 18. The outer tab portion 28, in effect, forms the distal end and an edge of the tab extension 24.

Figure 8:
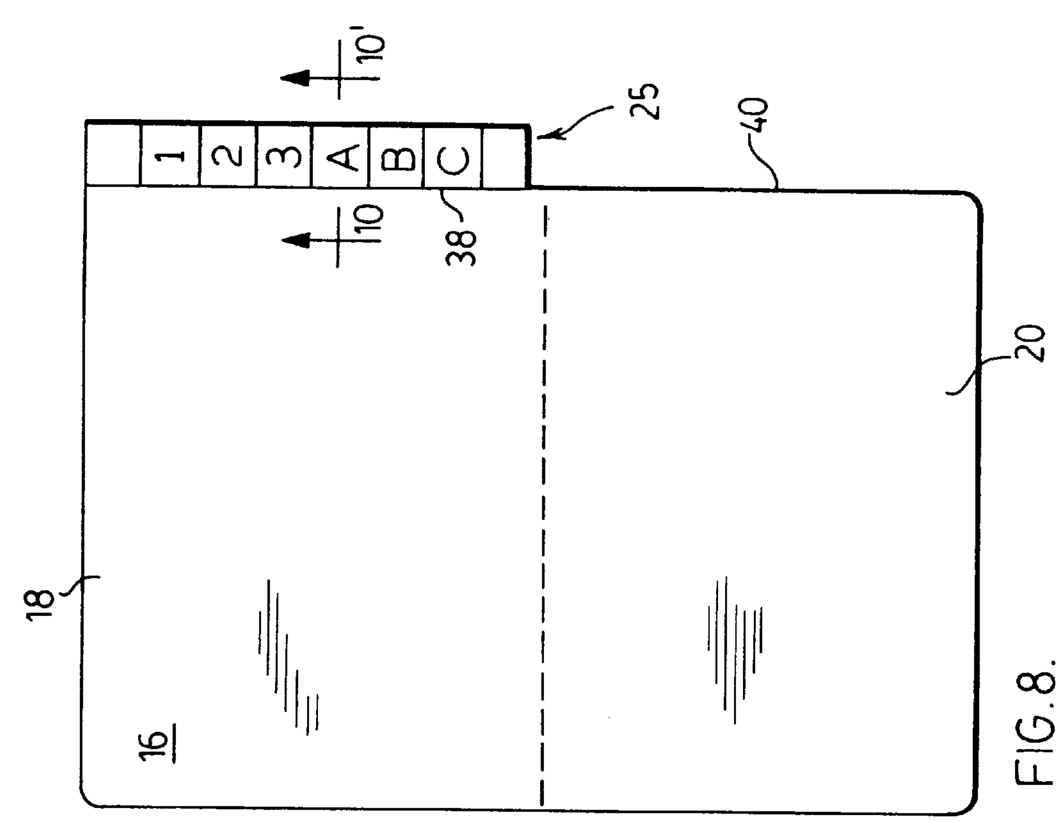
FIG. 8 shows a bottom plan view of the folder blank of FIG. 5 after the tab extension has been folded.

As shown in the first embodiment, the outer tab portion 28 and the inner tab portion 26 have a substantially identical shape and appearance such that when folded about the tab fold line 30, as seen in FIGS. 1 and 8, the inner tab portion 26 and outer tab portion 28 overlie each other and are substantially coextensive with each other.

FIG. 5 shows identifying indicia and other information printed on areas of the first surface 14 over the rectangular portion 36 of the first cover portion 18 and, as well, on areas of the first surface 14 over the second cover portion 20. Such information may comprise any information which would be useful and either unique to the individual file or forming possibly a blank form including spaces to be filled out after the blank 12 has been printed.

A blank 12, after printing, as shown in FIGS. 5 and 6, is further processed by having the release strip 34 removed so as to activate the adhesive strip 32. The tab extension 24 is then folded along fold line 30 in one desired direction so as to place the second surface 16 of the outer tab portion 28 into overlying opposing relation with the second surface 16 of the inner tab portion 26. With the second surface 16 of the outer tab portion 28 engaged by the adhesive strip 32, the outer tab portion 28 and the inner tab portion 26 are secured together.

Figure 7:
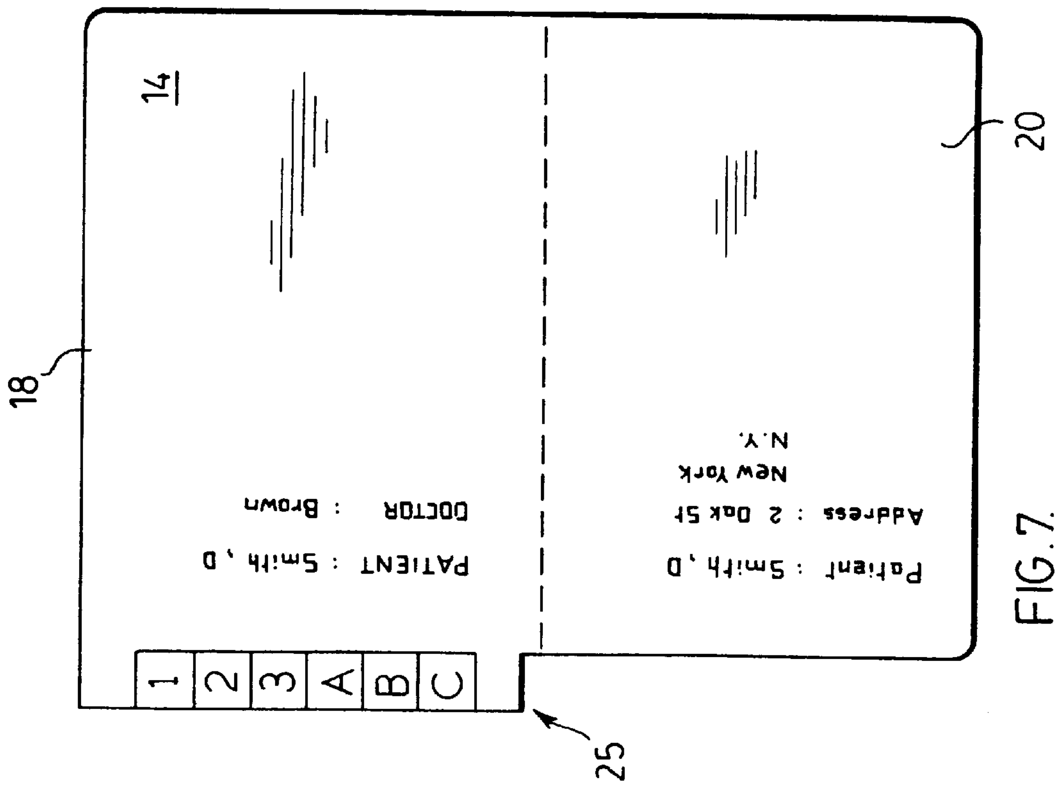
FIG. 7 shows a top plan view of the folder blank of FIG. 5 after the tab extension has been folded.

FIGS. 7 and 8 show both sides of the blank 12 after the outer tab portion 28 has been secured to the inner tab portion 26. For further use, the blank may be folded about its fold line 22 so as to be adapted to receive sheet material between the first cover portion 18 and the second cover portion 20. As apparent in FIGS. 7 and 8 and seen in FIGS. 1 and 2, the tab 25 extends beyond the first and second cover portions. Thus, both the inner tab portion 26 and the outer tab portion 28 overlying the inner tab portion extend from the first cover portion 18 beyond the edge 40 of the second cover portion 20.

FIGS. 1 and 2 show a preferred embodiment in which the first cover portion 18 and second cover portion 20 are folded in a direction about the cover fold line 22 such that the second surface 16 of the first cover portion 18 is opposed to the second surface 16 of the second cover portion 20. In this configuration, as illustrated in FIGS. 1 and 2, the printed material printed on the first surface 14 of the first cover portion and second cover portion other than on the tab extension, comprise outside surfaces of the file folder.

The file folder could be folded in the other direction about the cover fold line 22 such that the first surface 14 over the first cover portion and the first surface 14 over the second cover portion are in opposition in the inside of the file folder and present the printed material on the inside of the file folder.

In any case, folding the blank 12 about the cover fold line in either direction provides a tab 25 with indicia on the tab 25 which is visible from both the front or the back.

As shown in FIGS. 1 and 2 with the outer tab portion 28 folded inwardly towards the inside of the file folder between the covers, there is the reduced likelihood that on sliding the file folder 10 in and out on a shelf supported by the fold that the edge 38 of the outer tab portion 28 may become caught on adjacent files and the like.

The blank 12 may comprise any sheet material, preferably having some stiffness and preferably comprising a sheet of paperboard material as is conventional for most file folders. The materials from which conventional paperboard folders are provided are adequate for printing in most printing machines. To the extent that all of the blanks are made from the same colour paperboard then, when colour may be printed, it would be expected that the various individual colours would have the same hue. Advantageously, light coloured and, preferably, white covers may be provided when colour is desired to be printed on the tab extension so as to provide consistent quality colours of varying desired hues.

Figure 10:
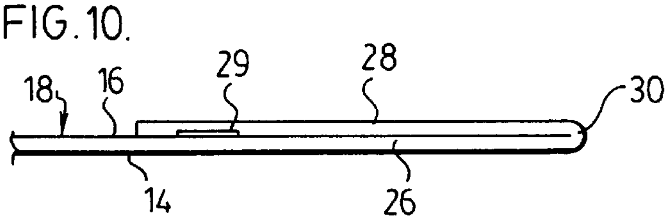
FIG. 10 is a partial cross-sectional view through the folder blank of FIG. 8 along section line 10–10'.

FIGS. 9 and 10 show cross-sectional views through the tab extensions of FIGS. 4 and 8 showing simple paperboard.

Figure 11:
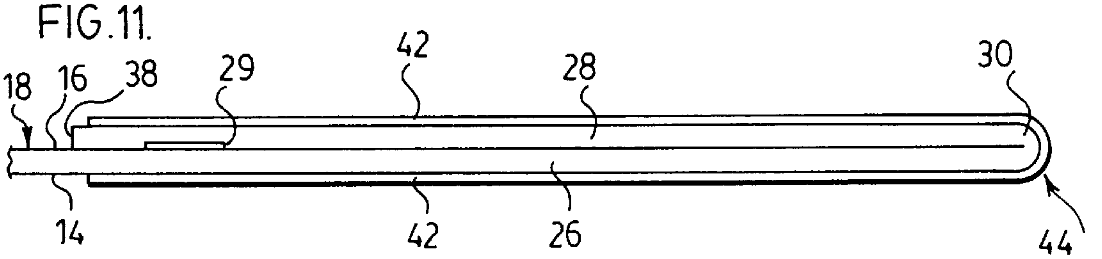
FIG. 11 shows a cross-sectional view similar to that of FIG. 10, however, of another embodiment of the invention in which a reinforcing layer is applied to one surface of the tab extension.

FIG. 11 is an enlarged cross-sectional view identical to that shown in cross-section of FIG. 10, however, of a modified embodiment. In FIG. 11, a thin layer 42 of material is laminated onto the first surface 14 of the tab extension overlying portions of both the inner tab portion 26 and the outer tab portion 28. As shown in FIG. 11, the layer 42 extends over the tab fold line 30 about the outer fold edge 44 . The layer 42 preferably is a thin material such as Mylar which is laminated to the first surface 14 of the blank. The layer 42 may serve a number of purposes. Firstly, it may provide a surface which advantageously permits printing thereon as by a printer. Printing may be enhanced by the nature of the surface being adapted to receive printings and the like permanently and against smudging. Printing may also be enhanced by the layer 42 being adapted to receive and present colours of ink printed thereon so as to have a constant hue. The layer 42 may also be of a constant colour such as, for example, white so as to provide a constant colour background and improve the hue of colours printed thereon.

The layer 42 may also comprise a reinforcing material to assist in strengthening the resultant tab 25 formed by the tab extension 24. While the layer 42 is shown merely on the tab extension 24, it is to be appreciated that it could extend over adjacent portions of the rectangular portion 36 of the first cover portion to also assist in reinforcing the same.

Figure 12:
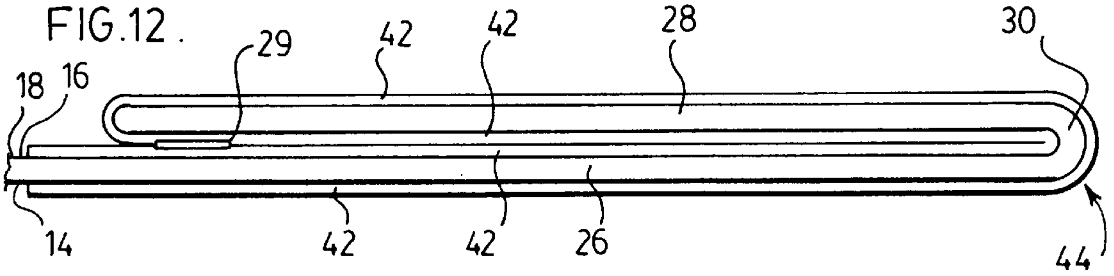
FIG. 12 is a cross-sectional view similar to that of FIG. 10, however, of a further embodiment in which a reinforcing layer is applied to both sides of the tab extension.

FIG. 12 shows a cross-sectional view similar to FIG. 11 but of yet another embodiment in which the layer 42 is applied to both the first surface 14 and the second surface 16 of the tab extension and layer 42 extends inwardly past the resultant tab onto the first cover portion 18. While FIG. 12 would appear to have the layer 42 substantially increase the thickness of the resultant tab, it is to be appreciated that layer 42 can be a very thin yet strong laminate and provide a substantial reinforcing structure. In the context of FIG. 12, the adhesive 29 is shown as being secured on top of the layer 42 and to therefore provide a bond between the layer 42 on the inner tab portion 26 and the layer 42 on the outer tab portion 28. Layer 42 can serve the purpose of being a layer which provides for superior adhesion of the adhesive strip.

A file folder in accordance with the present invention is readily adapted for use in a system for automated printing of the file folders including a printer 70 such as shown in FIG. 13 controlled by a computer system. An operator can direct a computer system to appropriately print the next file in any sequence with any desired information to be printed on the file. The file can be printed by the printer and after printing, there is merely the requirement of folding the tab extension and securing the tab extension in place.

Figure 14:
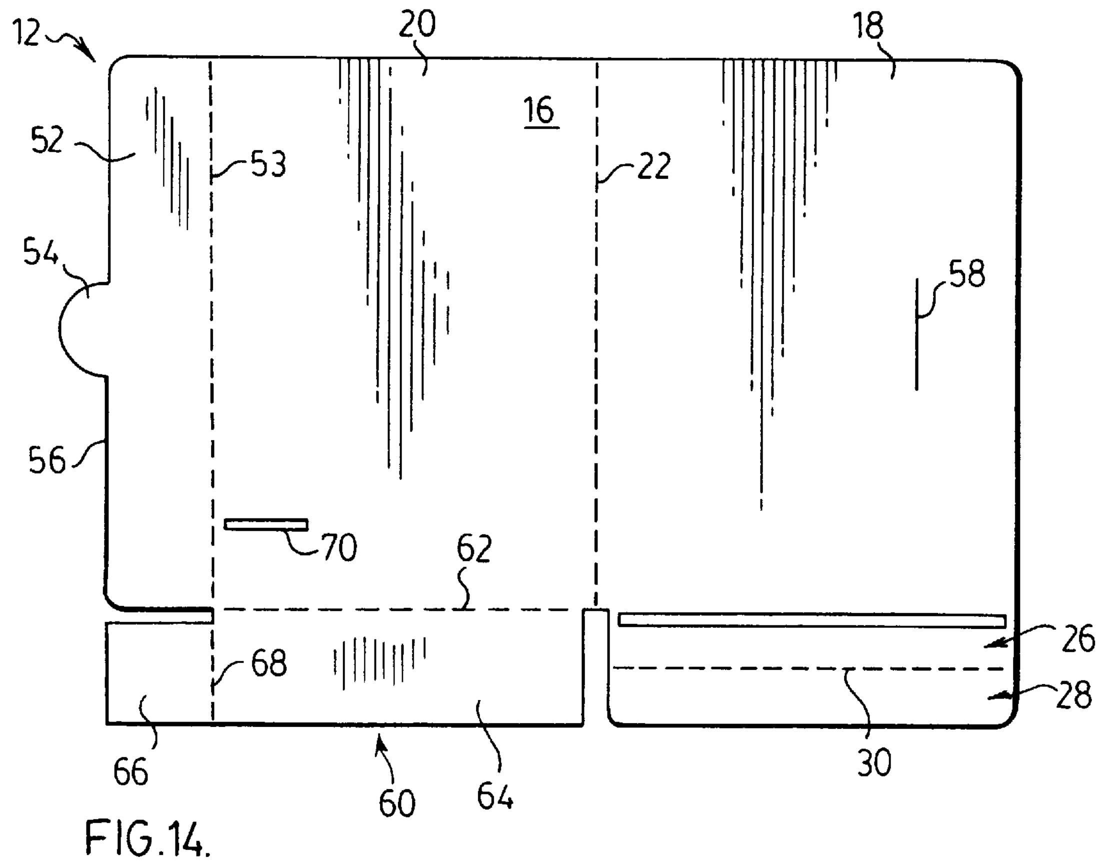
FIG. 14 is a bottom plan view of a folder blank in accordance with a second embodiment of the present invention.
Figure 15:
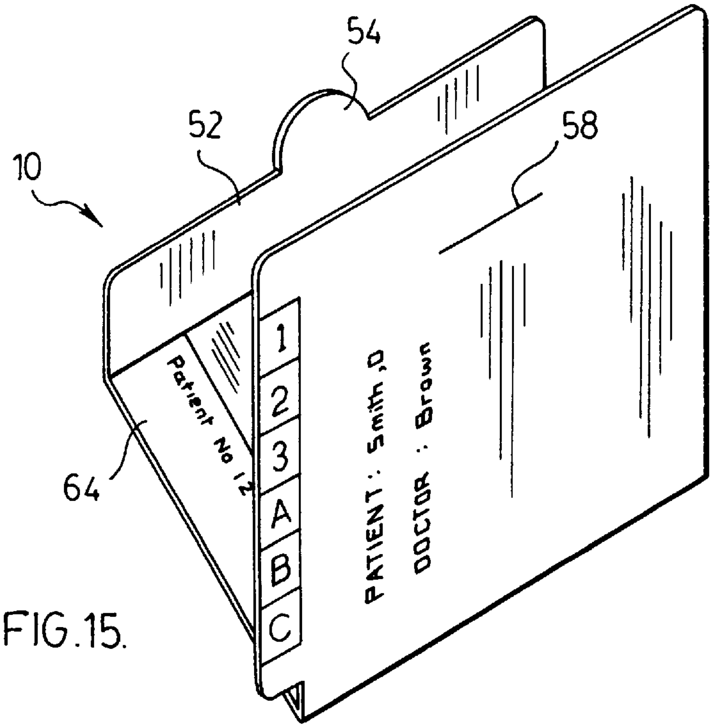
FIG. 15 is a pictorial view of a folder made from the blank shown in FIG. 14.

Reference is now made to FIG. 14 which shows a bottom view of a second embodiment of a blank 12 adapted for use with the method of the present invention to produce a folder 10 as shown in FIG. 15. The blank 12 of FIG. 14 is identical to the blank shown in FIG. 4 with the following exceptions.

Firstly, a third cover portion 52 is provided connected to the second cover portion 20 and joined by an extension fold line 53. The third cover portion 52 includes a closure extension 54 on its outer edge 56. First cover portion 18 has a closure slot 58 cut therethrough. The blank 12 is adapted to be folded with the third cover portion 52 to overlie the first cover portion 18 with closure extension 54 engaged in closure slot 58.

Secondly, a pocket extension 60 is provided connected to the second cover portion 20 and joined by a pocket fold line 62. The pocket extension 60 includes pocket front portion 64 and pocket support portion 66 joined by support fold line 68. A pocket adhesive strip 70 is provided on second surface 16 to engage the first surface of the pocket support portion 66. Pocket support portion 66 is folded about fold line 68 so that its second surface 16 overlies pocket front portion 64. Next, the pocket front portion 64 is folded about hinge line 62 so that the first surface of the pocket support portion 66 engages pocket adhesive strip 70, thus, in effect, forming a pocket to receive sheet material intermediate second surface 16 of the pocket front portion 64 and second surface 16 of the second cover portion 20. Information printed on the first surface of the pocket front portion 64 is visible inside a folder when folded as shown in FIG. 15.

Figure 16:
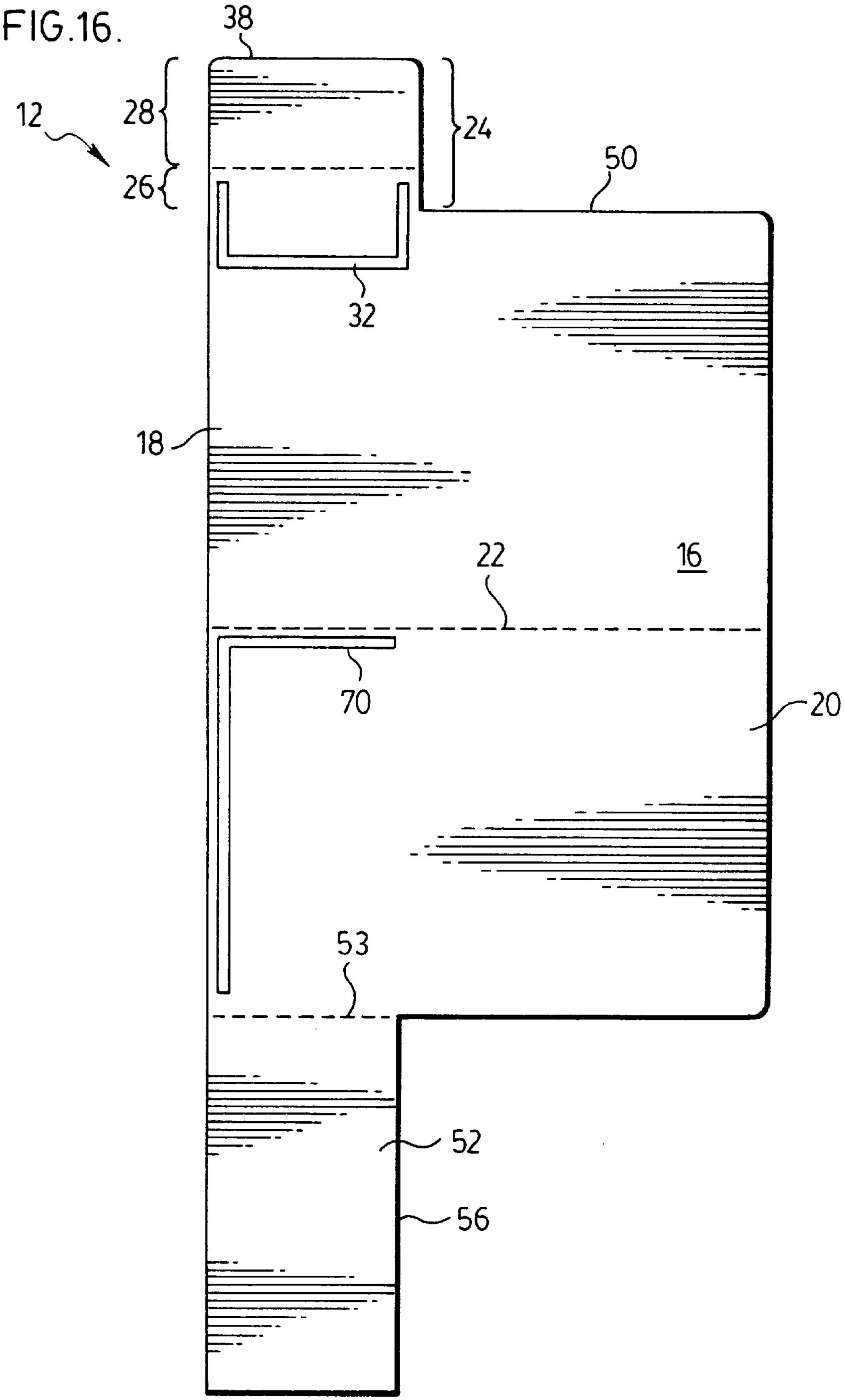
FIG. 16 is a bottom plan view of a folder blank in accordance with a third embodiment of the present invention.
Figure 17:
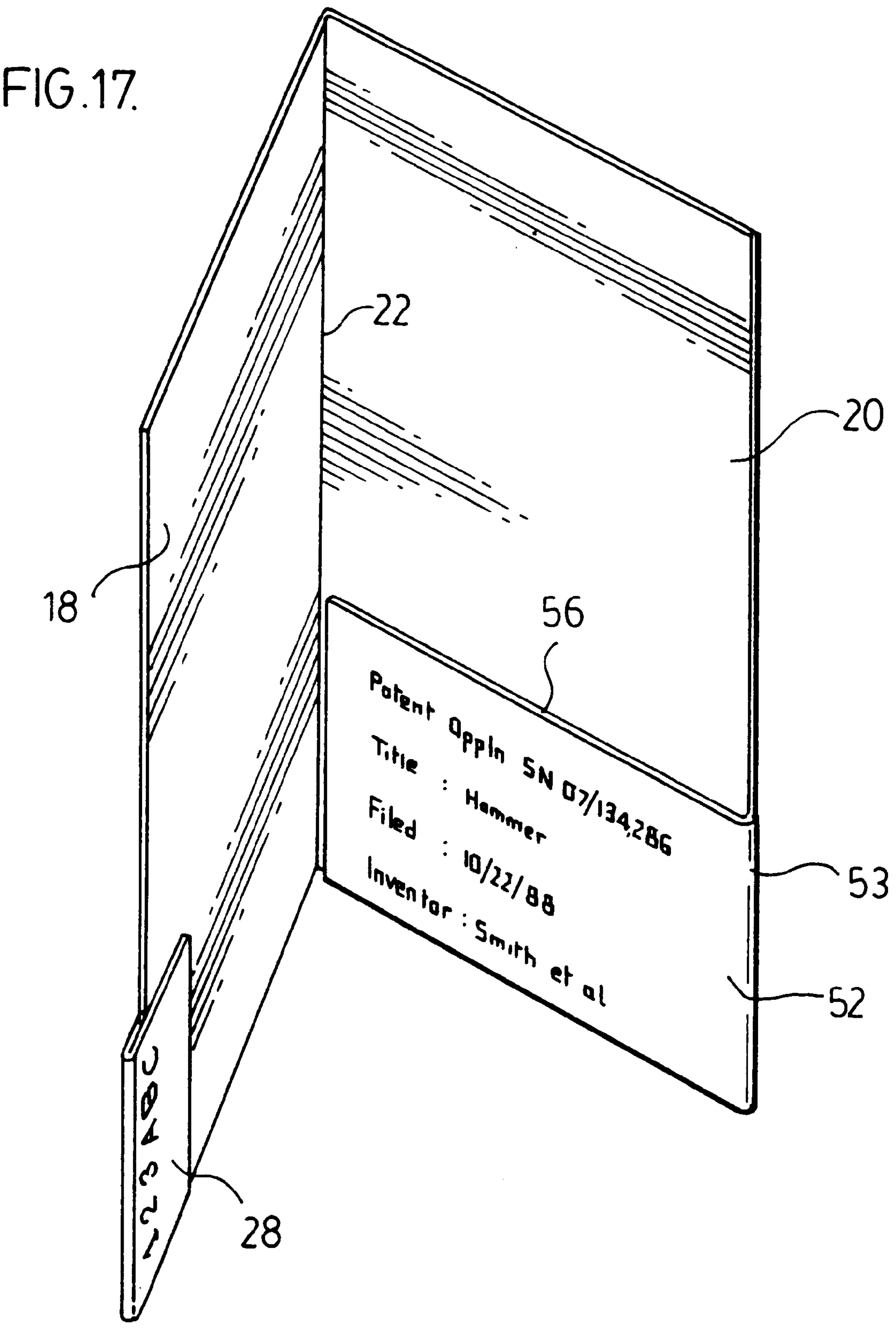
FIG. 17 is a pictorial view of a folder made from the blank shown in FIG. 16.

Reference is now made to FIG. 16 which shows a bottom plan view of a third version of a blank 12 adapted for use in accordance with the method of the present invention to provide a folder 10 as seen in FIG. 17. The blank 12 shown in FIG. 16 is labelled with reference numerals having correspondence to the reference numerals used in the other Figures in respect of the corresponding parts. The blank 12 similarly has a first cover portion 18 and a second cover portion 20 joined by a fold line 22. A tab extension 24 is provided on an edge 50 of the first cover portion opposite from the fold line 22. The tab extension has an inner tab portion 26 and an outer tab portion 28. The outer tab portion 28 is formed of a size larger than the inner tab portion 26 such that when the outer tab portion is folded over the inner tab portion, the edge 38 of the outer tab portion extends farther inwardly than the inner tab portion 26 and, therefore, extends beyond the edge 50. The adhesive strip 32 is shown as provided in a U-shape, portions of which are inward of the edge 50.

A third cover portion 52 is provided connected to the second cover portion 20 and joined by a fold line 53. A second adhesive strip 70 is provided in a U-shape on the second cover portion 20 such that when the third cover portion 52 is folded along the fold line 53, the third cover portion 52 may be secured over the second cover portion 20 and form a pocket with an opening adjacent the edge 56. FIG. 16 shows the second surface 16 of this blank 12. It is to be appreciated that the other side, not shown, may be printed with information and, for example, that information on the first surface 14 where it overlies the third cover portion 52 would appear on top of the pocket and the pocket would be disposed inside the file folder, assuming the file folder is folded about the cover fold line 22 to replace the second surface 16 of the first and second cover portions in opposition as shown in the folder 10 in FIG. 17.

Figure 18:
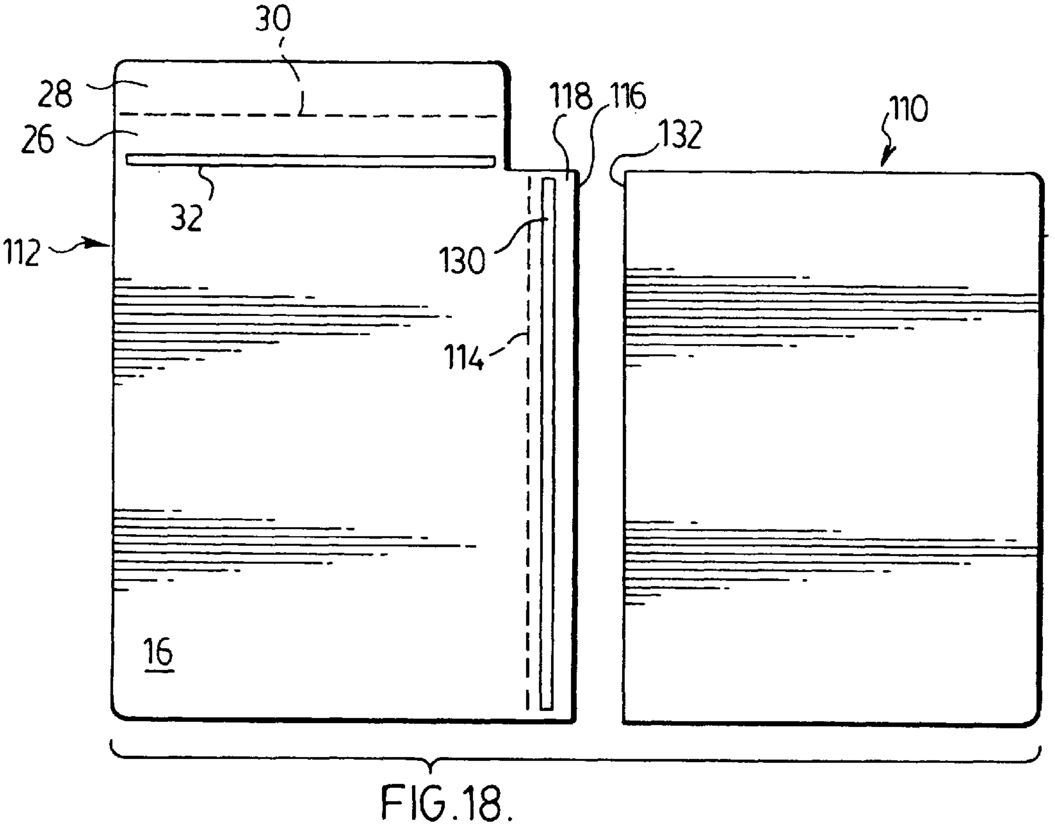
FIG. 18 is a plan view of blanks for a folder in accordance with a further embodiment of the invention.

Reference is made to FIG. 18 which shows a file folder before printing identical to that shown in the first embodiment of FIGS. 1 to 4 with the exception that the sheet is not one piece but rather is formed from two panels 110 and 112 to be joined together by an adhesive strip 130 in a manner as described in U.S. Pat. Nos. 5,025,978 and 5,104,250 to Pacione, issued Jun. 25, 1991 and Apr. 14, 1992, the disclosures of which are incorporated herein by reference.

First sheet 112 carries an elongate flap portion 118 between a scoreline 114 and a side edge 116. An adhesive strip generally indicated 130 covered by a removable release strip as in the manner of adhesive strip 32 of the first embodiment. The second sheet 110 is adapted to be secured to the first sheet by adhesive strip 130 to form a file folder with an edge 132 of sheet 110 located proximate scoreline 114 parallel thereto such that an edge portion of second sheet 110 overlies the adhesive strip 130. The sheets 112 and 110 can be printed while they are separate, and the reduced size of the sheets assists in passing the sheets through conventional width printers. After printing, the sheets may be secured together and the tab folded onto itself as described with the first embodiment.

Panel 112 carries a tab extension having an inner tab portion 26 and an outer tab portion 28 joined by a tab fold line 30 in the same manner as that described with the first embodiment.

Figure 19:
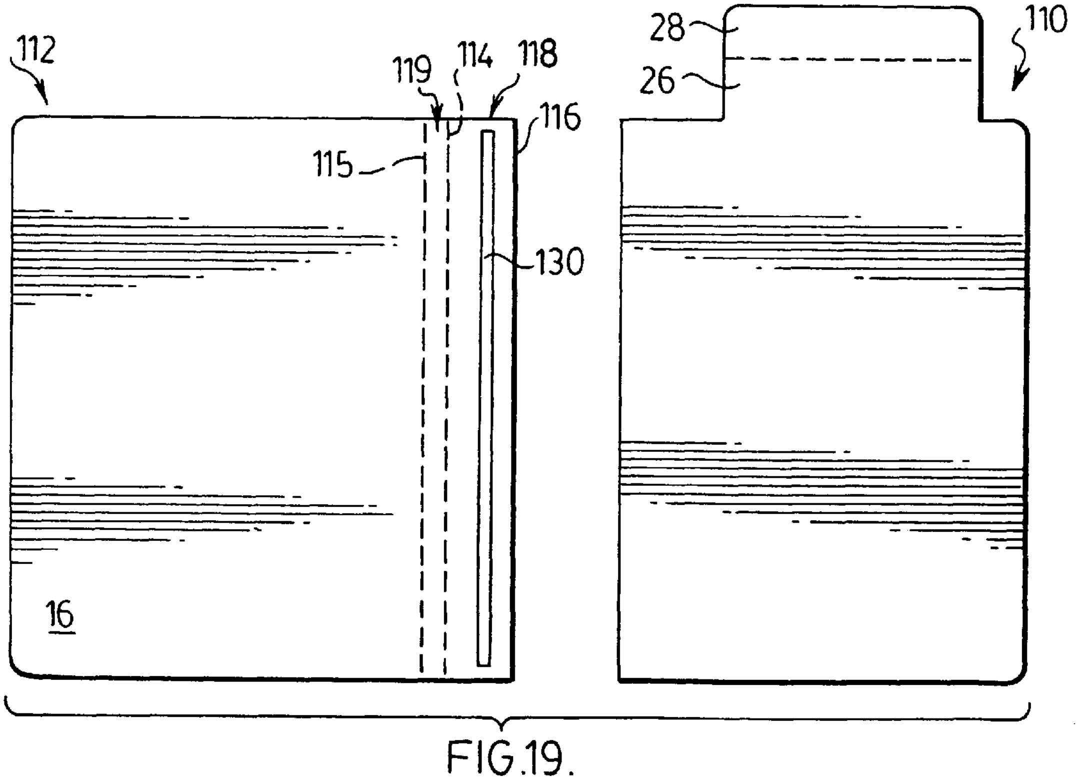
FIG. 19 is a plan view of blanks for a folder in accordance with a further embodiment of the invention.

Reference is made to FIG. 19 showing a folder before printing similar to that shown in FIG. 18, however, having two notable differences. Firstly, the tab extension with its inner tab portion 26 and outer tab portion 28 are carried on the second sheet 110, however, without an adhesive strip 32 being provided. Secondly, the first sheet 112 has an extra scoreline 115 with an extra thin elongate portion 119 to form a spline when the folder is formed as in the manner disclosed in U.S. Pat. No. 5,104,250.

As is the case with the two-piece folder of FIG. 18, the folder of FIG. 19 can have its two panels 110 and 112 printed before the panels are secured together by adhesive strip 130. Various other configurations of two-panel folders can be adopted as taught by U.S. Pat. No. 5,025,978 and 5,104,250.

The folder of FIG. 19 is illustrated without a specific mechanism to secure the outer tab portion 28 to overlie the inner tab portion 26 after printing. Of course, an adhesive strip could be used as taught with the first embodiment.

Figure 20:
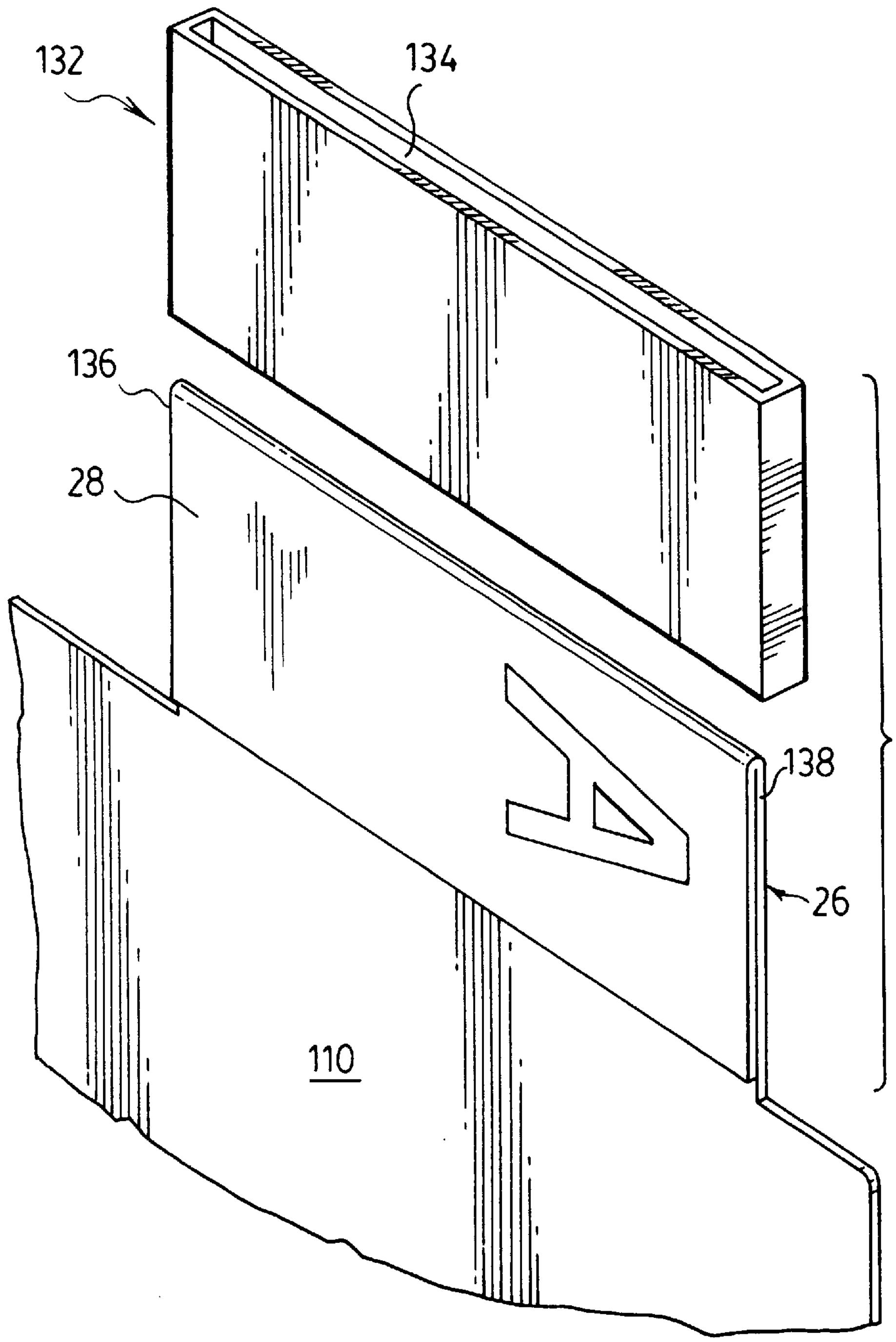
FIG. 20 is an exploded pictorial view of the tab of the blank of FIG. 19 folded and ready to receive a tab securing sleeve.
Figure 21:
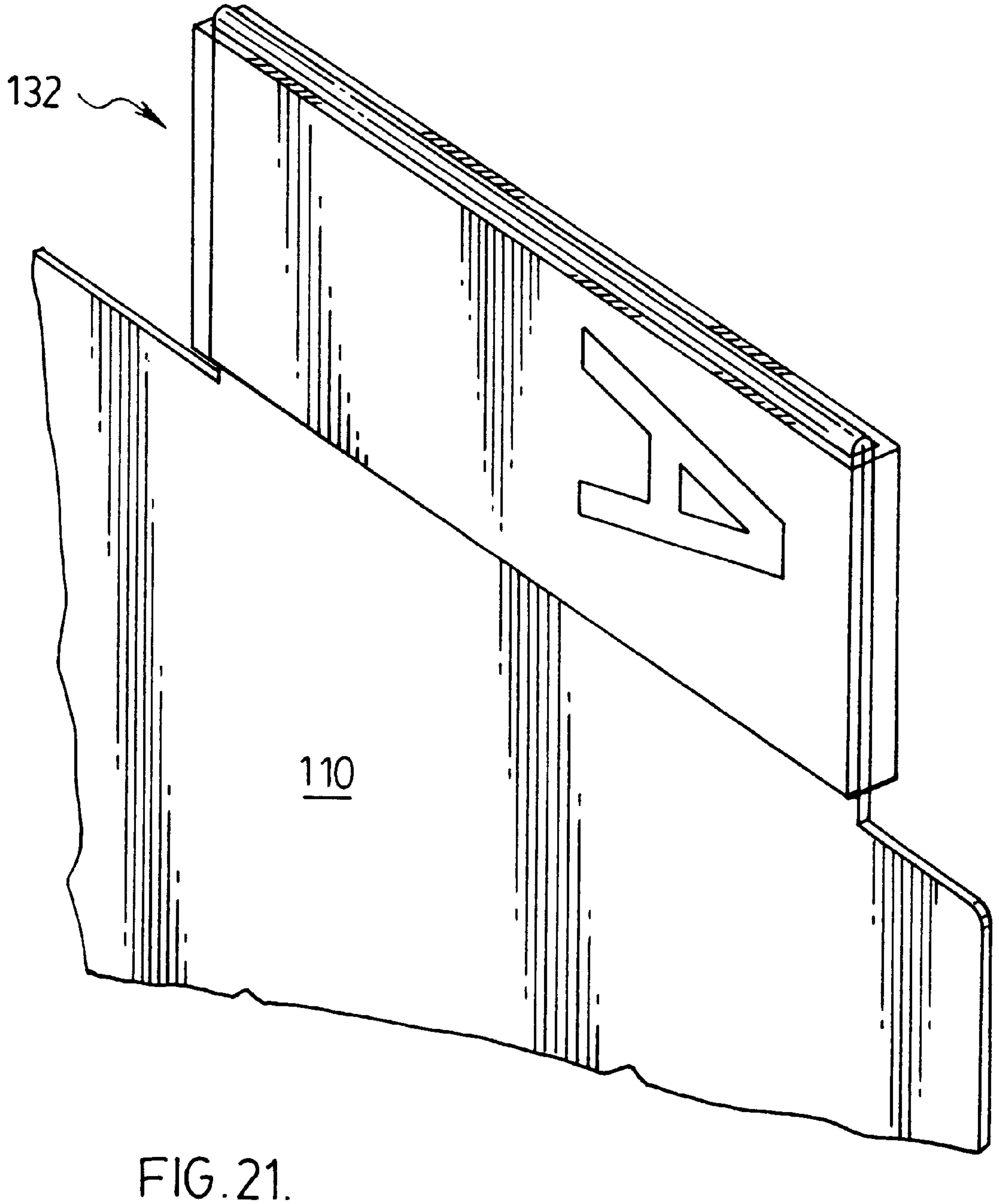
FIG. 21 is a pictorial view of the tab of FIG. 20 with the sleeve about the tab.

FIGS. 20 and 21 schematically illustrate a sleeve 132 to hold the tab portions to remain folded overlying each other as the tab portions are shown in these figures. As seen in FIG. 20, the sleeve 132 comprises a loop of thin transparent material which is sized to fit closely over the folded tab portions and, preferably, be retained thereon by friction.

Sleeve 132 has a central opening 134 therethrough sized, as to its width and length to fit snugly over the folded tab extension encircling the same from end edges 136 and 138 across both the outwardly directed first surfaces of the tab portions. The sleeve 132 is transparent so as to permit indicia printed on the tab portions to be visible through the sleeve. The sleeve keeps the tab portions 26 and 28 together in overlying relation and reinforces and protects the tab portions. The sleeve may be formed from many materials including plastic, vinyl and Mylar brand sheeting. The sleeve may be relatively rigid or flexible. By sizing the sleeve to have its central opening 134 closely sized to the dimensions of the folded tab portions, the sleeve may fit snugly. On the other hand, the sleeve 132 and its opening should be sized and configured to facilitate easy manual application of the sleeve to the folder tab portion.

FIG. 21 shows the central opening 134 to be open at both ends, however, this is not necessary and the sleeve could have opening 134 closed at its outer end to enclose the fold edge of the folded tab portions.

The sleeve 132 could be provided of elastic material such as flexible plastic film which can be slightly stretched to be manually applied over the tab portions and would then contract to hold the tab portions together.

Figure 22:
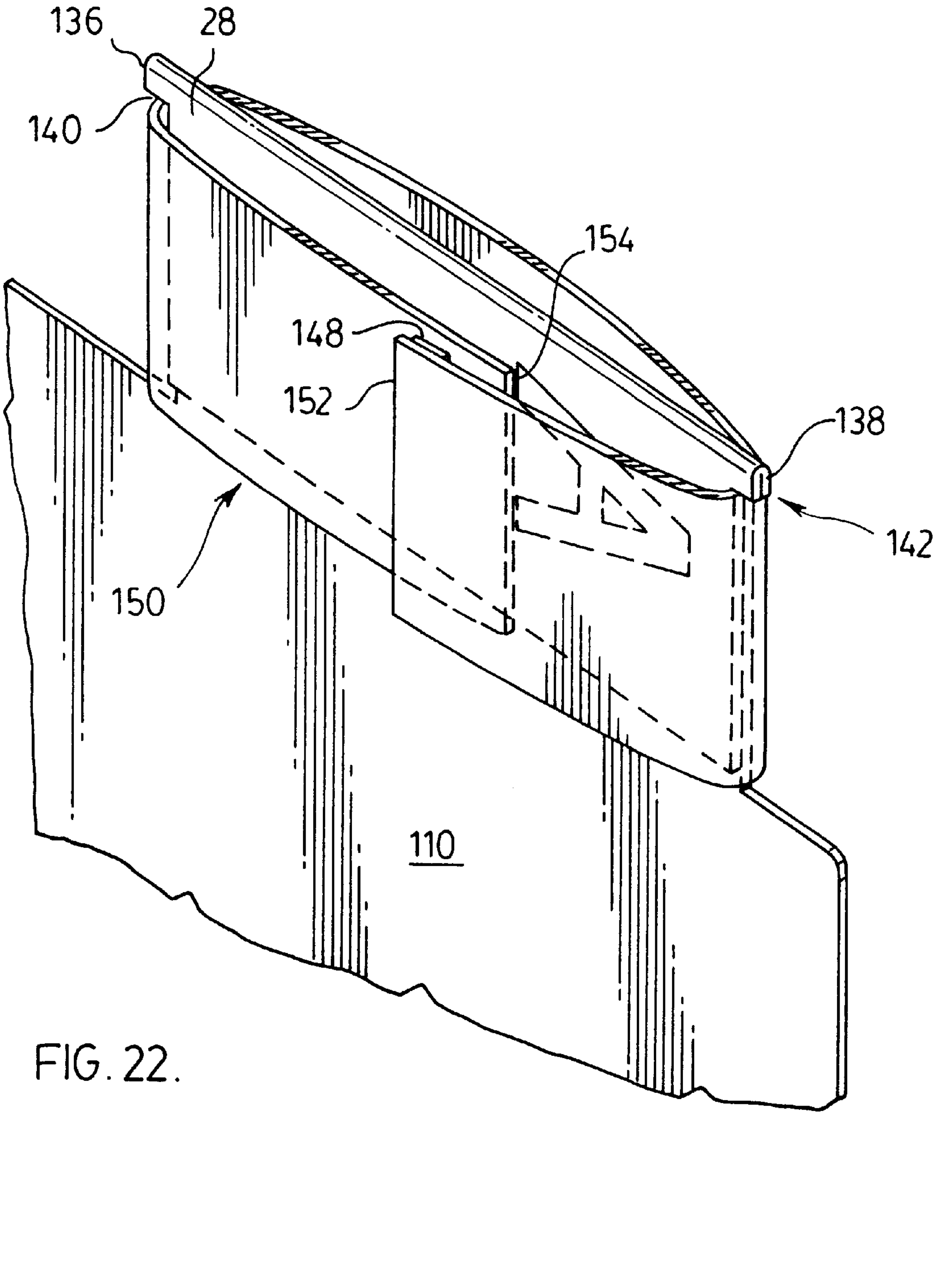
FIG. 22 is a pictorial view of a tab similar to that shown in FIG. 20, however, with a band member disposed about the tab.

Reference is made to FIG. 22 which shows a plan view of a folded tab extension similar to that shown in FIG. 20, however, with the tab portions having cutaway segments 140 and 142 in their end edges 136 and 138. A transparent band member 150 to function similar to sleeve member 132 of FIGS. 20 and 21 is shown as an elongate length of thin flexible transparent film, such as Mylar film, carrying a release sheet covered adhesive 148 on one end 152 to secure to the other end 154 when the band member 150 is manually drawn tight about the tab portions.

The cutaway segments 140 and 142, while not necessary, are sized to receive the band member therein and prevent its removal by sliding.

The band member 150 of FIG. 22 could be provided to have adhesive on its surface to engage the tab portions 26 and 28 at selected locations or over its entire length in which case the band member 150 could comprise a strip of transparent adhesive tape, to be carefully applied by a user and with, for example, the cutaway portions unnecessary.

Figure 23:
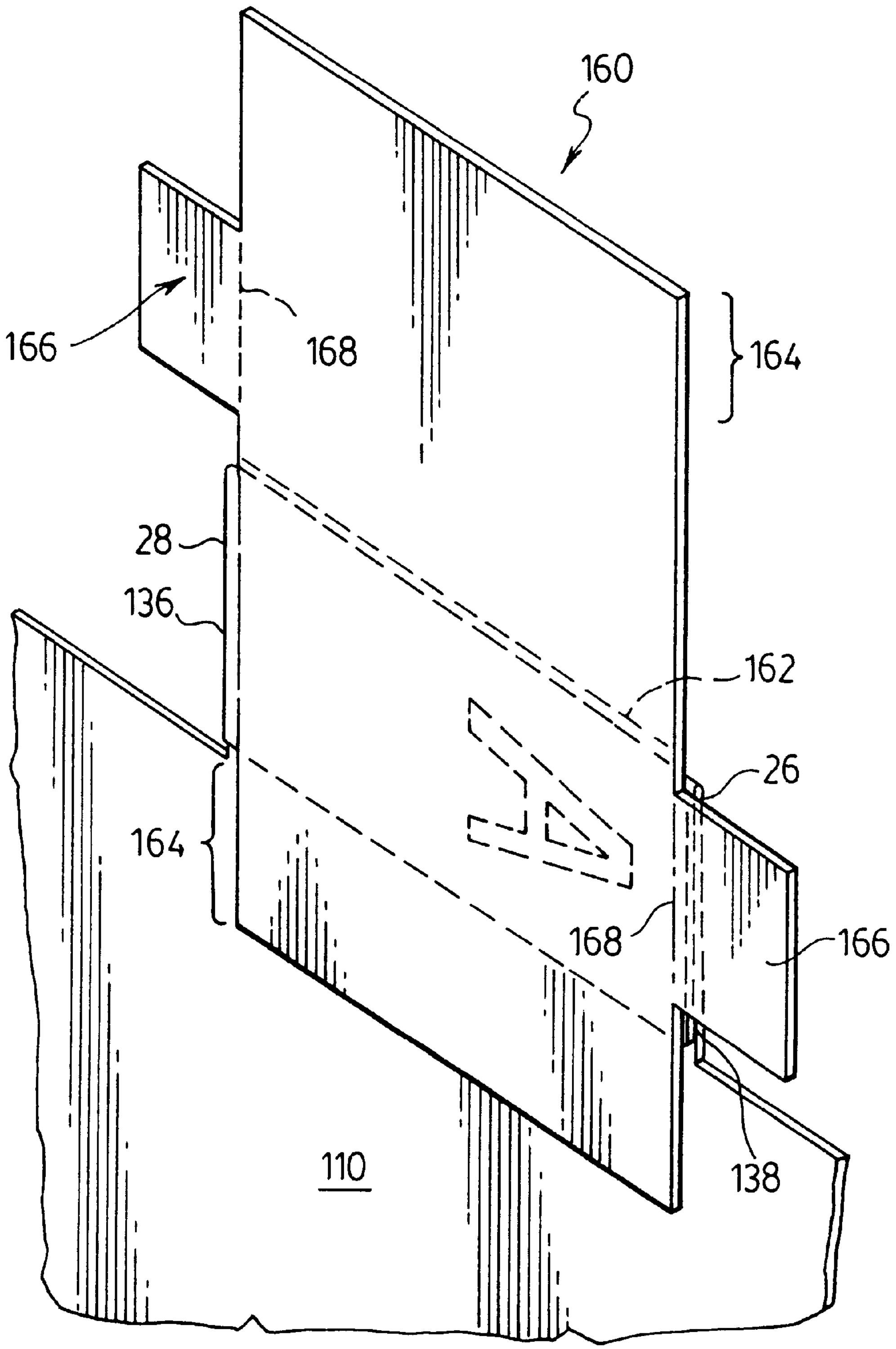
FIG. 23 is a pictorial view of a tab similar to that shown in FIG. 20, however, with a sheet member shown located for securing about the tab.

Reference is made to FIG. 23 which shows tab portions 26 and 28 similar to those in FIG. 20, however, with a flat planar, transparent sheet member 160 with adhesive on its undersurface position ready to be applied to the tab portions. The member 160 is to be folded about a center line 162 so as to extend over the fold of the tab extension and cover both sides of the tab extension. The member 160 extends, preferably as shown, beyond the tab portions as with portions 164 to engage the folder beyond the tab portions. The member 160 carries two side flaps 166 to be folded about fold lines 168 to wrap about the end edges 136 and 138 of the folded tab portions.

Preferably, the member 160 is provided with release sheeting covering its entire adhesive backside and with the release sheet preferably formed in separate parts to assist application. Preferably, each half of the member 160 has a separate release sheet on each side of fold line 162. Preferably, each flap 166 also has a separate release sheet to fold line 168.

With the release sheet removed from the member 160 on one side of fold line 162, that half of member 160 may then be applied over one of the tab portions. The release sheet for the other half of the member 160 can then be removed for folding and adhesion of the other half of the member 160 over the other of the tab portion. Similarly, the release sheet may be separately removed from each side flap 166 and each side flap folded about its respective end edge 136 or 138.

Each of the sleeve 132 of FIGS. 20 and 21, band member 150 of FIG. 22 and sheet member 160 of FIG. 23 are transparent and may be formed from suitable materials including plastics, vinyl, polyethylene, acetates, Mylar brand sheeting and the like. Each may be clear, however, alternatively, they may be provided to have a colour. For example, a supply of sleeves 132 may be provided in a number of colours. The file folder tab portion may advantageously be white in colour, indicia printed thereon in black and the different coloured transparent sleeves 132 selected to provide the tab with a colour for distinguishing.

The present invention has been described with particular reference to the file cover comprising paperboard. It is to be appreciated that paper of various paper weights can be used such as paper of thickness in the range of about 8 to 15 microns, more preferably, 10 to 13 microns, also referred to as 10 to 13 point paper. Preferably, the file folder will have some stiffness. The file folder could, for example, comprise relatively thin plastic material, vinyl, paperboard, cardboard, manilla paper, paper coated with plastic and the like.

The file folder shown in the preferred embodiments have a single fold line. It is to be appreciated that the fold line may comprise a plurality of fold lines such that, in use, the file folder may be folded so as to have a gussett of appropriate thickness to assist in receiving sheet material of desired thickness therein.

The preferred embodiments show as the adhesive a layer of adhesive having a suitable release sheet. Such systems are preferred. The release sheets have, surprisingly, been found to pass through conventional printers without becoming dislodged yet can be relatively easily removed by a user to activate the adhesive. Other adhesive systems could be utilized which may pass through a printer yet may be activated, preferably manually, after printing. Rather than provide the adhesive on the blank prior to printing, it is within the scope of the present invention to apply an adhesive after printing which would serve to secure the outer tab portion to the inner tab portion when they are folded together. A suitable mechanical apparatus could be developed so as to receive a blank after printing, apply the adhesive and to then fold the outer tab portion over the inner tab portion.

While the invention has been described with reference to preferred embodiments, many modifications and variations will now occur to persons skilled in the art. For a definition of the invention, reference is made to the appended claims.

I claim:

1. In combination a blank adapted for forming a folder and a securing member, the blank comprising a substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab fold line therebetween wherein on folding the tab extension about the tab fold line in one direction the second surface of the sheet on the outer tab portion overlies the second surface of the sheet on the inner tab portion, wherein with the sheet folded about the cover hinge line and the tab fold line, the inner tab portion and the outer tab portion overlying the inner tab portion both extend from the first cover portion beyond the second cover portion, an inner labelling area on the first surface of the sheet over the inner tab portion adapted to have indicia printed thereon by a printing mechanism, an outer labelling area on the first surface of the sheet over the outer tab portion adapted to have labelling indicia printed thereon by a printing mechanism the securing member comprising a sleeve member to encircle the inner and outer tab portion for securing the inner tab portion and outer tab portion in overlying relation with second surfaces of the inner and outer tab portions facing each other.

2. A combination as claimed in claim 1 wherein the sleeve member is transparent to permit viewing of indicia on the inner and outer tab portions covered by the sleeve member through the sleeve member.

3. In combination, a blank adapted for forming a folder and a securing member, the blank comprising a substantially planar sheet having a first surface and a second surface, the sheet having a first cover portion joined to a second cover portion along a mutual cover hinge line therebetween wherein on folding the sheet about the cover hinge line the second cover portion overlies the first cover portion and the folder is adapted to receive sheet materials between the first cover portion and the second cover portion, the first cover portion including a tab extension forming at least a segment of an edge of the first cover portion, the tab extension comprising an inner tab portion and an outer tab portion, the inner tab portion and outer tab portion joined together along a mutual tab fold line therebetween wherein on folding the tab extension about the tab fold line in one direction the second surface of the sheet on the outer tab portion overlies the second surface of the sheet on the inner tab portion, wherein with the sheet folded about the cover hinge line and the tab fold line, the inner tab portion and the outer tab portion overlying the inner tab portion both extend from the first cover portion beyond the second cover portion, an inner labelling area on the first surface of the sheet over the inner tab portion adapted to have indicia printed thereon by a printing mechanism, an outer labelling area on the first surface of the sheet over the outer tab portion adapted to have labelling indicia printed thereon by a printing mechanism, the securing means adapted for securing the inner tab portion and outer tab portion in overlying relation with second surfaces of the inner and outer tab portions facing each other, the securing member comprising a sheet of transparent material with an adhesive on one side to be adhered over the first surfaces of the inner and outer tab portions and to extend from the first surface of the outer tab portion either onto the second surface of the first cover portion adjacent that overlaid by the outer tab portion or from the first surface of the outer tab portion onto the first surface of the inner tab portion about end edges of each inner and outer tab portions formed at each end of the tab fold line.

* * * * *